2,929,293

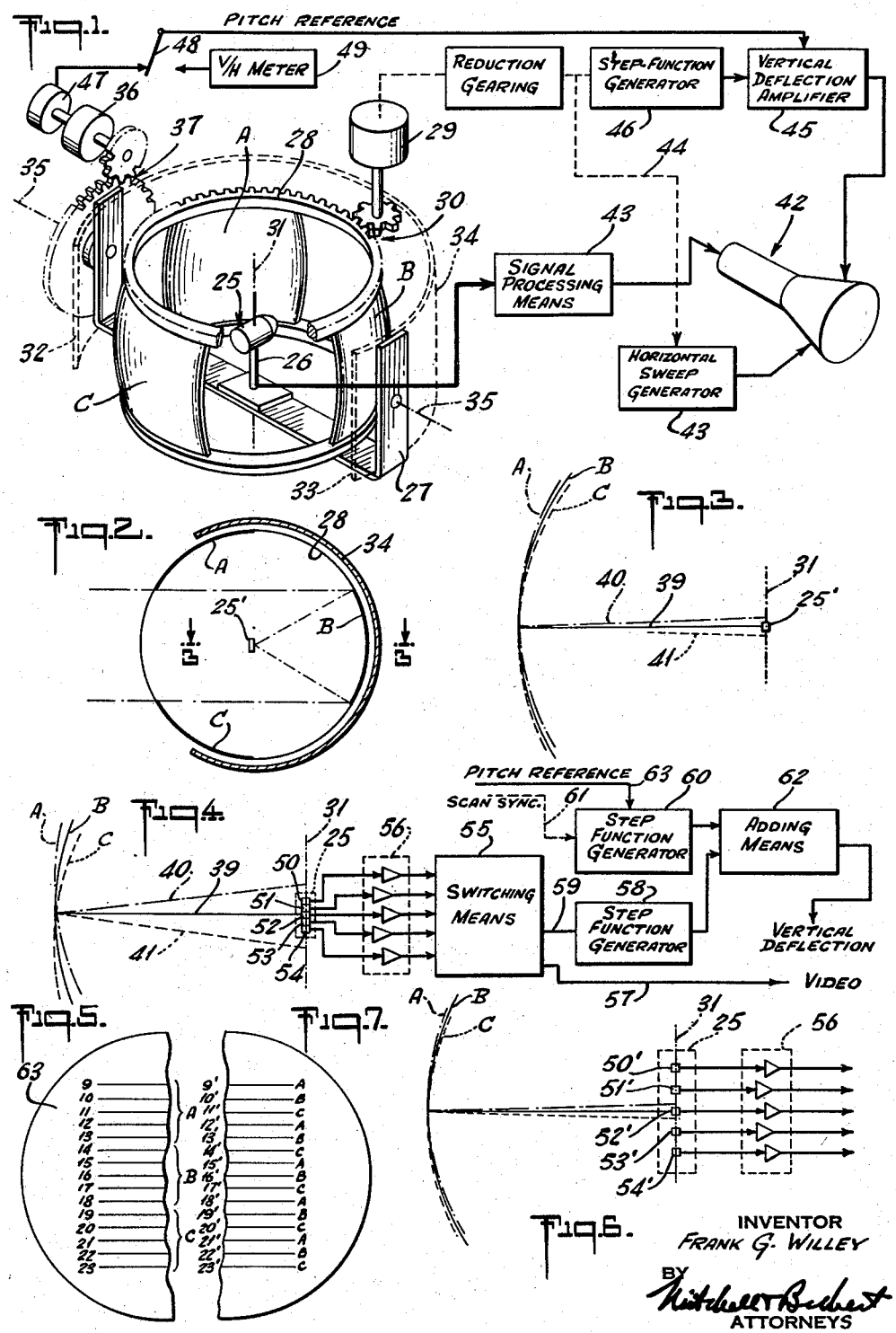

INTERLACED OPTICAL SCANNING MEANS

Frank G. Willey, Roslyn Heights, N.Y., assignor to Servo Corporation of America, New Hyde Park, N.Y., a corporation of New York Application October 19, 1954, Serial No. 463,296

13 Claims. (Cl. 88—1)

My invention relates to an improved optical scanning and display means and to energy-responsive means utilizing such optical scanning. The present application incorporates certain refinements and improvements over the invention disclosed in the copending patent application of Henry Blackstone and Frank G. Willey, Serial No. 320,272, filed November 13, 1952.

It is an object of the invention to provide improved scanning means of the character indicated.

It is another object to provide improved means for continually and automatically scanning a field of view for varying energy levels in said field.

It is a specific object to meet the above objects with a multiple-element optical scanner inherently achieving line interlace for successively scanned lines.

It is a further specific object to provide display means for suitably displaying and for integrating the intelligence developed by successive interlaced scans.

It is a general object to meet the above objects with a scanner arrangement which, for certain applications, may reduce the complexity of the energy-responsive means cooperating therewith, that is, wherein the number of channels used for indicating, amplification, and switching may be reduced and substantially simplified.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a simplified view, partly in perspective, and illustrating elements of a scanning and display device incorporating features of the invention;

Fig. 2 is a simplified end elevation of scanner elements of Fig. 1 as viewed along the axis of rotation of the scanner;

Fig. 3 is a simplified optical diagram, as viewed substantially in the plane 3—3 of Fig. 2;

Fig. 4 is a fragmentary optical and electrical diagram illustrating components of a modification of the arrangement of Fig. 1;

Fig. 5 is a simplified fragmentary view of a display, representative of scanning with the action developed by the combination of Fig. 4; and Figs. 6 and 7 correspond to Figs. 4 and 5, respectively, but illustrate a further modification.

Briefly stated, my invention contemplates an improved scanner having a plurality of optical elements for causing a particular energy-responsive means to scan a corresponding plurality of spaced scan lines in the field of view, for each full revolution of the scanner. In previous arrangements, all optical elements have been mounted with their axes of optical symmetry in a common radial plane in which the energy-responsive means is substantially located, but according to my new configuration, the optical elements are eccentrically offset with respect to each other so that each optical element will cause correspondingly offset imaged scan lines in the field of view, insofar as the energy-responsive means is concerned. Arrangements are disclosed for displaying the video output of the energy-responsive means so as to establish proper integration of the variously offset scan lines. Arrangements are also disclosed, whereby, for the case in which the energy-responsive means comprises a line array of separate detector elements, each optical element will cause the array to develop different lines of video intelligence, appropriately interlaced to avoid duplication.

Referring to Fig. 1 of the drawings, my invention is shown in application to a scanner of the type described in greater detail in said copending patent application. Accordingly, energy-responsive means 25 within a suitable capsule may be relatively fixedly mounted as by means of a pedestal 26 on support means 27. The optical scanner may comprise a drum 28 journalled for rotation in the support means 27 (by means not shown) and continuously driven, as by a motor 29, via rim-drive means 30. The scanner drum 28 may rigidly support a plurality of optical elements which, in the form shown, are three elements A—B—C having like properties and mounted in preferably equally spaced relation about the axis 31 of rotation of the scanner. The optical elements A—B—C may be mirrors, and the space between mirrors may be substantially equal to the angular width of the mirrors about the axis of rotation. All mirrors may be of the same focal length which, in the form shown, is substantially equal to the mirror-mounting radius about the axis of rotation 31.

As explained more fully in said copending application, the field of view for any particular scan line developed on rotation of the scanner 28 may be of the order of 60° and may require a clearance or window opening of the order of 120° for a three-mirror system of the character shown. In order to eliminate spurious responses, it is desirable to shield the scanner at 34 for all but the limits 32—33 of the window opening. The shield 34 is merely shown in Fig. 1 by way of suggestion, and it will be understood to be mounted fixedly to and effectively as a part of the support means 27. For certain applications, it is desirable to provide for bodily pitching or scan-depression movement of the described scanner, and, in that event, a pitch axis 35, passing preferably through the central radial plane of symmetry of optical responses and preferably perpendicular to the axis of rotation 31, will be understood to suggest provision for this feature. I have shown at 36 a pitch-drive motor with geared connection at 37 to the support means 27 in order to train the mechanism in pitch or in scan-depression, depending upon the utilization of the device.

In accordance with the invention, one full rotation of the scanner 28 is caused to develop a plurality of different scan lines, all through an inherent property of the optics in the scanner. To achieve this, I so mount the elements A—B—C that they will be eccentrically offset with respect to each other in reference to the central radial plane of symmetry of scan. Stated in other words, the axes of optical symmetry of the focusing elements A—B—C preferably all intersect or substantially intersect the axis of rotation 31, but the points of these intersections are preferably lognitudinally spaced from each other along said axis of rotation 31.

The inherent function of the described arrangement will be better understood by reference to Figs. 2 and 3, Fig. 3 being understood as a schematic representation of sections through the scanning mirrors A—B—C as they successively scan their respective lines in the field of view. The mirror B is shown to have its axis 39 of optical symmetry substantially in the radial plane of symmetry of scanning action and aligned with the energy-responsive element 25′ contained within the capsule 25 (Fig. 1). The mirror A is shown eccentrically mounted with respect to the mirror B and with its axis 40 of optical symmetry offset from the radial plane in which the axis 39 is located, but nevertheless directed generally for intersection with the axis 31 of scan rotation. The mirror C is similarly eccentrically offset, but in the opposite direction, so that its axis 41 of optical symmetry is offset to the side of the radial plane in which the axis 39 is located. Again, the axis 41 is preferably directed for substantial intersection with the axis of scanned rotation 31. If the capsule 25 should be but one energy-responsive element or indicator 25', then I prefer that the eccentric offsets of the mirrors with respect to each other shall be such as to space the intersections of axes 39—40—41 with scan axis 31 by an amount representing one to two detector-element widths. For example, if the spot size achievable with the detector element 25' is effectively 0.25 degree viewed through any optical system, then the eccentric offsets from the central mirror B are preferably from 0.25 to 0.5 degree, although, for certain special purposes, other eccentric displacements may be desirable.

In order to display properly integrated intelligence developed from the video-signal output of cell 25, video-display means may be employed, and I show cathode-ray-tube display means 42 having an intensity-modulation connection to the cell 25, via suitable signal-processing means 43, which may include one or more amplifiers. Assuming that the predominant scan lines are to be displayed horizontally across the face of the tube 42, I show a horizontal sweep generator 43, with synchronized connection at 44 to the line-scan rate. The vertical deflection may be governed by suitable amplifier means 45 controlled by a step-function generator 46. The generator 46 should also have a synchronized connection to the line-scan rate so that a different one of three available bias voltages may be applied on the vertical-deflection axis for the duration of each successive scan line. The synchronization for deflection voltages should thus be such, for example and with reference to Fig. 3, that successive biases will produce a first horizontally swept line scan for the optical element A, a second line scan for the optical element B, and a third line scan for the optical element C, whereupon the sweep pattern for the display will repeat itself for the next rotation of scanner 28.

In airborne scanning operations, that is, operations in which my scanner is employed for scanning the terrain beneath an aircraft, the scanner-rotation axis 31 is preferably oriented with the true flight axis of the aircraft, and the window opening 32—33 faces below the aircraft and symmetrically on opposite sides of the vertical plane including the flight axis. Usually there is no need for pitch control as by means 36, but should there be an adjustment in pitch, suitable pick-off means 47 may be connected, as through selector switch 48, in controlling relation with the amplifier 45, thereby controlling the magnitude of bias steps called for by the generator 46; the scaling of bias steps thus controlled by means 47 should be realistically related to the effective elevation through which pitch is traversed.

For the usual airborne employment of my scanner, however, the pitch angle remains constant and may, for example, be substantially at right angles to the aircraft, so that scan lines are directed beneath. In such case, the video output representing a plurality of scanning cycles may at one time be displayed in properly displaced relation on the face of the tube 42, even though this may represent a plurality of revolutions of the scanner 28. This displacement may be achieved through progressive depression of the vertical-deflection bias, scaled to the aircraft's velocity-altitude function, and may be available from a so-called V/H meter 49, as of the form disclosed in copending application Serial No. 444,990, filed July 22, 1954, and issued on March 24, 1959, as Patent Number 2,878,711, in the name of Henry Blackstone. In the event of V/H control of the display, the selector switch 48 may be thrown to derive V/H rather than pitch control of the deflection amplifier 45, as will be understood.

In Figs. 4 and 5, I show applicability of my invention to multiple-element arrays within the energy-responsive means 25. In the form shown in Fig. 4, the elements 50—51—52—53—54 are aligned predominantly in the direction of the axis 31 of scanner rotation and are substantially in the focal plane of mirrors A—B—C. In order that there shall be no overlap or duplication of lines scanned by one mirror with the lines scanned by a successive mirror, I prefer that the relative eccentric offsets of the axes 40—39—41 of these mirrors shall be substantially the effective angular width of the array 50 to 54, as seen through any optical system. This will mean that the currently scanned area seen through mirror A will effectively place the entire detector array on one side of the central position (of the array) and that the currently scanned area seen by mirror C will be correspondingly offset on the other side.

For display purposes, high-speed switching means 55 may rapidly commutate the outputs of elements 50 to 54, as amplified at 56, and a single line 57 may relay the commutated video signal to the intensity-modulation connection for the display means (not shown). Horizontal sweeping may be as previously described, and vertical deflection will also involve essentially the same treatment, there being an appropriate vertical-deflection bias applied to the vertical-deflection axis for each instantaneously available element of video signal, regardless of the optical system through which it is seen. Thus, a first or high-speed step-function generator 58 may operate in synchronism with the switching sequence in means 55, as suggested by a connection 59, and a second or slow-speed step-function generator 60 may respond to scan synchronization, available mechanically as suggested by the line 61 and described in greater detail at 46 in Fig. 1. Adding means 62 may combine the outputs of the slow-speed and high-speed step-function generators 60—58 to achieve the desired bias coordination on the vertical-deflection axis and, if desired, the pitch-reference or V/H-reference control may be applied at 63 in controlling relation with the step-function generator 60.

In operation, the slow-speed step-function generator 60 will be understood to establish (for each full scan-line duration) a given reference bias on which the high-speed step-function output of generator 58 is superposed. For this first scan line then, the optical element A may cause display on the face 63 of the cathode-ray tube of a first five lines labelled 9—10—11—12—13 in Fig. 5. Upon termination of such first scan line, the mirror B will be caused to scan the field in eccentrically offset relation to the field scanned by mirror A, and the slow-speed step-function generator 60 will appropriately depress the bias on the vertical-deflection axis, so that lines labelled 14—15—16—17—18 will be developed in the display, properly related to the lines 9—13. Similarly, for the third and last scan sweep of a given rotation of scanner 28, generator 60 will further depress the bias on the vertical-deflection axis, and scan lines 19—20—21—22—23 will be developed, properly related to the lines 9—18. Thus, for one full rotation of the scanner 28, the number of lines that can be displayed will be a full frame or raster, representing the number of detector elements (five) times the number of scanner elements (three).

The arrangement of Figs. 6 and 7 is in many respects the same as that described for Figs. 4 and 5, the only difference being that the individual energy-responsive elements 50'—51'—52'—53'—54' within the cell 25 are spaced from each other by an amount representing at least the effective angular width of each energy-responsive element times the number of optical elements in the scanner. For simplification, this spacing is shown as three times the detector-element width. In order to achieve line-interlace for this spacing of detector elements, the eccentric offsets of the respective optical elements A—B—C are relatively small and for the arrangement shown are preferably substantially the effective angular width of each detector element.

The video signals for the arrangement of Fig. 6 may be processed in the same amplifier means 56 as described for Fig. 4 and may be commutated in switching means 55 for supply to the intensity-modulation connection of the display means. Since the detector-element responses represent wider spacings, however, the high-speed step-function generator 58 must be adjusted for greater bias steps; also, since the mirrors are less eccentrically displaced from each other than in the case of Fig. 4, the slow-speed step-function generator 60 must be adjusted for relatively small incremental bias steps.

In operation, the device of Fig. 6 will achieve a writing of the lines labelled A in Fig. 7 (being lines 9'—12'—15'—18'—21') for the first optical-element scan, namely, the scan by mirror A. The next successive scan will be by mirror B and will achieve display of the lines labelled B (being lines 10'—13'—16'—19'—22'). Finally, the third optical element C will achieve writing of the lines labelled C (being lines 11'—14'—17'—20'—23').

While I have described eccentric offsets of optical-element axes (or eccentric mountings of optical elements) without particular regard for specifying angles, it will be understood that for the case of lenses the full eccentric axis offset is implied, whereas for the case of offset mirrors, the predominant optical axis of the offset element need only be displaced one half the angle through which it is desired that the reflected image shall have been offset; this will be understood from the nature of a mirror to reflect with effectively a doubling of the angle of incidence (i.e. angle of incidence plus angle of reflection) for rays collected thereby.

It will be seen that I have described a relatively simple improvement over the scanners previously referred to and that my improvement can inherently achieve line-interlace, to complete a given raster of display in shorter time and/or with fewer elements than heretofore possible. Reduction of the number of elements required to create a raster implies important economies in amplifiers, switching complexity and the like, and there is the further advantage that the entire raster appears to the eye to have less of a flickering characteristic.

While the invention has been described in detail for the preferred forms shown, it will be understood that modifications may be made without departing from the scope of the invention as defined in the claims which follow.

I claim:

1. Optical-scanning means, comprising support means, energy-responsive means relatively fixedly carried by said support means, optics including a plurality of focusing elements focused on said energy-responsive means and imaging said energy-responsive means in a field of view, said focusing elements being in angularly spaced relation and mounted for bodily rotary displacement about an axis passing substantially through said energy-responsive means, each of said focusing elements having a predominant optical axis of symmetry passing through the axis of rotation of said elements, the intercepts of said optical axes with said axis of rotation being longitudinally spaced with respect to each other along said axis of rotation, whereby for a full bodily rotation of said elements, the respective images of said energy-responsive means due to said respective focusing elements may be caused to scan a plurality of spaced scan lines in the field of view.

2. Optical-scanning means, comprising support means, energy-responsive means relatively fixedly carried by said support means, a plurality of like optical elements in angularly spaced relation about said energy-responsive means, and means for bodily rotating said focusing elements about an axis passing substantially through said energy-responsive means, each of said focusing elements imaging said energy-responsive means in a field of view and sweeping the same across said field on rotation of said bodily rotatable means, one of said focusing elements having an optical axis of symmetry substantially aligned with said energy-responsive means, and another of said focusing elements having an axis of optical symmetry eccentrically displaced with respect to said energy-responsive means, whereby for a full bodily rotation of said focusing elements, said energy-responsive means may be caused to scan a plurality of spaced scan lines in a field of view.

3. Optical-scanning means, comprising support means, energy-responsive means relatively fixedly carried by said support means, a plurality of like optical focusing elements in angularly spaced relation about said energy-responsive means and imaging said energy-responsive means in a field of view, and means for bodily rotating said focusing elements about an axis passing substantially through said energy-responsive means, one of said focusing elements having an axis of optical symmetry eccentrically displaced with respect to said energy-responsive means on one side of the radial plane including said energy-responsive means, and a second of said focusing elements having an axis of optical symmetry eccentrically displaced with respect to said energy-responsive means on the other side of the radial plane, whereby the image developed by each focusing element may be caused to scan a different portion of the field of view for each bodily rotation of said focusing elements.

4. In an optical scanner, support means, energy-responsive means relatively fixedly carried by said support means, means mounted for bodily rotary displacement about said energy-responsive means and about an axis fixed with respect to said support means, three focusing mirrors of like focal length carried by said last-defined means in equal angularly spaced relation and imaging said energy-responsive means in a field of view, the spaces between said mirrors being substantially equal to the effective angular width of said mirrors, the focal length of said mirrors being substantially the mounting radius about the axis of rotation, the axis of optical symmetry of one of said mirrors being substantially in the radial plane including said energy-responsive means, the axis of optical symmetry of another of said mirrors being eccentrically displaced on one side of said radial plane, and the axis of optical symmetry of the third of said mirrors being eccentrically displaced on the other side of said radial plane.

5. Optical-scanning means, comprising support means, energy-responsive means relatively fixedly carried by said support means, optics including a plurality of focusing elements focused on said energy-responsive means, said focusing elements being in angularly spaced relation and mounted for bodily rotary displacement about an axis passing substantially through said energy-responsive means, said energy-responsive means including a plurality of energy-responsive elements aligned in spaced relation substantially on said axis of rotation, each of said focusing elements having a predominant optical axis of symmetry passing through the axis of rotation of said focusing elements, the intercepts of said optical axes with said axis of rotation being longitudinally spaced with respect to each other along said axis of rotation.

6. A device according to claim 5, in which the effective eccentric offset of said optical axes is less than the effective angular spacing of the elements of said energy-responsive means.

7. A device according to claim 6, in which the amount by which the effective angular spacing of said energy-responsive elements exceeds the offset of adjacent optical axes is substantially a multiple of the energy-responsive element size, said multiple corresponding to the plurality of focusing elements.

8. A device according to claim 5, in which the effective eccentric offset of said optical axes is greater than the effective angular spacing of the elements of said energy-responsive means.

9. A device according to claim 8, in which the amount by which the effective offset of adjacent optical axes exceeds the effective angular spacing of said energy-responsive elements is substantially a multiple of the energy-responsive element size, said multiple corresponding to the plurality of said energy-responsive elements.

10. Optical-scanning and display means, comprising a line array of relatively fixed energy-responsive means, a rotatable optical support including a plurality of angularly spaced optical elements imaging said energy-responsive means in a field of view and causing said array of energy-responsive means to scan a corresponding plurality of successive sets of scan lines per revolution, said optical elements being relatively offset with respect to each other so as to cause images of said energy-responsive means to scan interlaced sets of scan lines in a field of view for any full rotation of said optical elements, signal-processing means including amplifier means responsive to said array of energy-responsive means, high-speed switching means sampling the output of said amplifier means corresponding to each element of said array, display means intensity-modulated by the output of said switching means, and means synchronized with operation of said switching means and with rotation of said optical elements for causing successive sets of intensity-modulated lines reflecting the output of said amplifier means to trace sets of display lines spaced in accordance with the relative offsets of said optical elements.

11. Optical-scanning and display means, comprising relatively fixedly mounted energy-responsive means, a scanner mounted for bodily rotation about an axis passing substantially through said energy-responsive means, optics including a plurality of angularly spaced like optical elements carried by said scanner and imaging said energy-responsive means on successive scan lines in a field of view, said optical elements being eccentrically offset with respect to each other, whereby the successive lines scanned by said energy-responsive means upon rotation of said scanner will be in spaced relation in the field of view, cathode-ray tube display means having intensity-modulation means connected to said energy-responsive means, means synchronized with rotation of said scanner for sweeping one axis of said cathode-ray display means in synchronism with successive optical scans of the field of view, and step-function generator means synchronized with scanner rotation for biasing the other deflection axis of said cathode-ray display means in steps corresponding successively to successive optical elements of scans of the field of view.

12. The device according to claim 11 adapted for aerial reconnaissance and in which the axis of rotation of said scanner is substantially aligned with the flight axis of carrying aircraft, and velocity-altitude-responsive means connected in controlling relation with the magnitude of bias steps relayed by said step-function generator to said other deflection axis of said cathode-ray display means.

13. A device according to claim 11, in which said energy-responsive means includes a support mounted for rotation about a pitch axis normal to the predominant direction of the field of view and normal to the axis of rotation of said scanner, and means responsive to orientation of said support about said pitch axis and in controlling relation with the magnitude of bias steps relayed by said step-function generator to said other deflection axis of said cathode-ray display means.

References Cited in the file of this patent

UNITED STATES PATENTS

| | | |
|---|---|---|
| 1,876,272 | Bayer | Sept. 6, 1932 |
| 2,453,502 | Dimmick | Nov. 9, 1948 |
| 2,553,606 | Rines | May 22, 1951 |
| 2,668,869 | Iams | Feb. 9, 1954 |
| 2,709,716 | Haller | May 31, 1955 |
| 2,779,819 | Graham | Jan. 29, 1957 |